(12) United States Patent
Chun

(10) Patent No.: US 6,307,341 B1
(45) Date of Patent: Oct. 23, 2001

(54) WIPER DRIVING APPARATUS FOR VEHICLES

(75) Inventor: Gyung Sang Chun, Inchun (KR)

(73) Assignee: Da Sung Co., Ltd. (KR)

( * ) Notice: Subject to any disclaimer, the term of this patent is extended or adjusted under 35 U.S.C. 154(b) by 0 days.

(21) Appl. No.: 09/511,727

(22) Filed: Feb. 24, 2000

(30) Foreign Application Priority Data

Dec. 30, 1999 (KR) .................................................. 99-66176

(51) Int. Cl.$^7$ ................................ B60S 1/22; B60S 1/26; B60S 1/24; G05B 5/00
(52) U.S. Cl. ...................... 318/445; 318/446; 15/250.16; 15/250.17
(58) Field of Search .................................... 318/440–448, 318/464–469, DIG. 2; 15/250.16, 250.3, 250.19, 250.17, 250.2; 74/70, 75, 600

(56) References Cited

U.S. PATENT DOCUMENTS

| | | | |
|---|---|---|---|
| 4,454,626 | * 6/1984 | Schmidt et al. | 15/250.16 |
| 4,597,129 | * 7/1986 | Eustache et al. | 15/250.16 |
| 4,798,102 | * 1/1989 | Buschur et al. | 74/600 |
| 4,924,726 | * 5/1990 | Rogakos et al. | 74/600 |
| 5,390,391 | * 2/1995 | Zimmer et al. | 15/250.2 |
| 5,502,866 | 4/1996 | Battlogg . | |
| 5,894,627 | * 4/1999 | Irikura | 15/250.31 |
| 6,000,092 | * 12/1999 | Irikura | 15/250.13 |
| 6,145,181 | * 11/2000 | Murata et al. | 29/450 |

* cited by examiner

*Primary Examiner*—Paul Ip
(74) *Attorney, Agent, or Firm*—Rockey, Milnamow & Katz, Ltd.

(57) ABSTRACT

A wiper driving apparatus for vehicles capable of preventing the temporary standstill and overrun phenomenon of wiper blades. The apparatus includes the wiper blades which receive a driving force from a driving lever rotated by a rotating force of a wiper motor, and reciprocate between a start position and a return position so that the wiper blades wipe foreign substances such as moisture and dust scattered on a surface of a windshield glass, a hinge shaft provided to be projected from a free end of the driving lever, a ball type pin fixed to one side of the driving lever, being eccentric for a predetermined distance with respect to the hinge shaft on the free end of the driving lever so that the ball type pin moves downwardly and rotates in one direction as it traces a relatively small circular arc during a forward rotation of the driving lever while the ball type pin moves upwardly and rotates in the other direction as it traces a relatively large circular arc during a reverse rotation of the driving lever, and a sequential wiper blade rotation type parking means fixed centering around the hinge shaft on the free end of the driving lever so that the ball type pin moves upwardly as it traces a curved line by applying a specified pressure to the ball type pin during a rotation of the ball type pin.

3 Claims, 7 Drawing Sheets

WIPER DRIVING APPARATUS FOR VEHICLES

BACKGROUND OF THE INVENTION

1. Field of the Invention

The present invention relates to a wiper driving apparatus for vehicles. In particular, the present invention relates to a wiper driving apparatus for vehicles which can prevent the temporary standstill phenomenon of wiper blades by restraining the overrun phenomenon of the wiper blades during a forward rotation thereof and restraining a driving lever from rotating after an elapse of a specified time in which the driving lever stands still during a reverse rotation of the wiper blades.

2. Description of the Prior Art

FIGS. 1 and 2 show a conventional wiper driving apparatus for vehicles disclosed in Korean Un-examined Publication No. 96-37441. The conventional wiper driving apparatus includes a driving lever 20 which is fixed to and rotates in a body with a driving shaft 10 of a wiper motor, a drive-force transfer arm 40 which is connected to the driving lever 20 and reciprocates in a manner that wipers perform their own function during a forward rotation (A) of the driving lever while the wipers are parked during a reverse rotation (B) of the driving lever, and two driven arms 50, connected to a free end of the drive-force transfer arm 40, for driving two wiper arms 60 and two wiper blades 70.

According to the above apparatus, a ball bearing 30b is slidably supported on a hinge shaft of the driving lever 20 within a predetermined angle. During the forward rotation (A) of the driving lever, the ball bearing 30b rotates in a direction nearing the rotating shaft of the driving lever 20 as it traces a relatively small circular arc, and thus the wiper blade 70 rotates by a predetermined rotating angle including a start position (S) and a return position (R) so that the wipers perform their own function. During the reverse rotation (B) of the driving lever, the ball bearing 30b slidably moves in a direction getting away from the rotating shaft of the driving lever 20 as it traces a relatively large circular arc, and thus the wiper blade 70 moves to a parking position (P) which is deeper than the start position (S).

Also, according to the above apparatus, the driving lever 20 is structured to be folded in one direction. During the forward rotation (A) thereof, the hinge point of the outer end of the driving lever 20 rotates to trace the relatively small circular arc in a state that the driving lever 20 is folded to a predetermined angle, and thus the wiper blade 70 is driven to move in forward and reverse directions. During the reverse rotation (B) of the driving lever 20, the hinge point of the outer end of the driving lever 20 rotates to trace the relatively large circular arc as the driving lever is unfolded, and thus the wiper blade 70 moves to the parking position (P) which is deeper than the start position (S).

However, the conventional wiper driving apparatus has the drawbacks that during the forward rotation (A) of the driving lever 20, the overrun phenomenon of the wiper blade 70 happens as the outmost hinge point of the driving lever 20 or the position of the ball bearing 30b is changed due to the inertial force of rotation of the wiper. Also, at the time point when the angle of the reverse rotation (B) of the driving lever 20 reaches about 45° as the driving lever 20 rotates reversely from the return position (R) to trace the relatively large circular arc, the driving lever 20 becomes unfolded, or the ball bearing 30b, which is slidably supported on the plate type driving lever 20 within the predetermined angle, rapidly slides in the direction getting away from the rotating shaft of the wiper driving motor after its temporary standstill state, so that the wiper blade 70 rotates after the specified waiting time with noises, deteriorating the operational reliability of the wiper.

Specifically, in the parking operation of the wiper blades 70 according to the conventional wiper driving apparatus, the ball bearing 30b, which is eccentrically arranged on the hinge shaft of the driving lever 20, rotates and moves in the upward direction getting away from the driving shaft of the wiper driving motor as it traces the large circular arc during the reverse rotation of the driving lever 20. At this time, the inertial force of rotation of the wiper affects the drive-force transfer arm 40, and the position of the ball bearing 30b connected to the drive-force transfer arm 40 is changed during its rotation, resulting in that the wiper blade 70 rotates over the predetermined rotating angle, and this causes the overrun phenomenon of the wiper blade 70, which is the rapid rotation of the wiper blade 70 after the specified waiting time, to happen.

The overrun phenomenon may cause the driver to misrecognize it as malfunction of the wiper driving apparatus. The overrun phenomenon also degrades the visual field of the driver especially in case of rain, resulting in an uncomfortable driving state.

SUMMARY OF THE INVENTION

It is an object of the present invention to solve the problems involved in the prior art, and to provide a wiper driving apparatus for vehicles which can prevent a temporary standstill phenomenon of wiper blades, and thus improve the operational reliability of the wipers.

In order to achieve the above object, there is provided a wiper driving apparatus for vehicles having wiper blades which receive a driving force from a driving lever rotated by the rotating force of a wiper motor, and reciprocate between a start position and a return position so that the wiper blades wipe foreign substances such as moisture and dust scattered on a surface of a windshield glass, the apparatus comprising a hinge shaft provided to be projected from a free end of the driving lever, a ball type pin fixed to one side of the driving lever, being eccentric for a predetermined distance with respect to the hinge shaft on the free end of the driving lever so that the ball type pin moves downwardly and rotates in one direction as it traces a relatively small circular arc during a forward rotation of the driving lever while the ball type pin moves upwardly and rotates in the other direction as it traces a relatively large circular arc during a reverse rotation of the driving lever, and a sequential wiper blade rotation type parking means fixed centering around the hinge shaft on the free end of the driving lever so that the ball type pin moves upwardly as it traces a curved line by applying a specified pressure to the ball type pin during a rotation of the ball type pin.

BRIEF DESCRIPTION OF THE DRAWINGS

The above object, other features and advantages of the present invention will become more apparent by describing the preferred embodiment thereof with reference to the accompanying drawings, in which.

DETAILED DESCRIPTION OF THE PREFERRED EMBODIMENT

The preferred embodiment of the present invention will now be explained with reference to FIGS. 3 to 8C.

Figure 1:
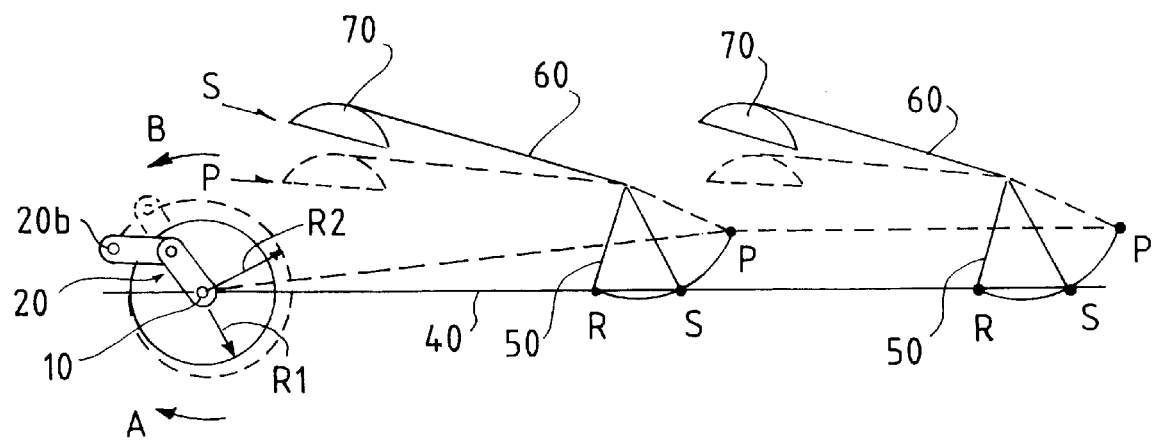
FIG. 1 is a view schematically illustrating a conventional wiper driving mechanism.
Figure 2:
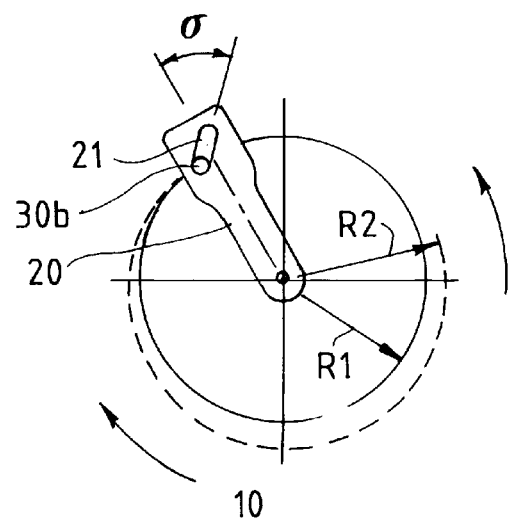
FIG. 2 is a view schematically illustrating another conventional wiper driving mechanism.
Figure 3:
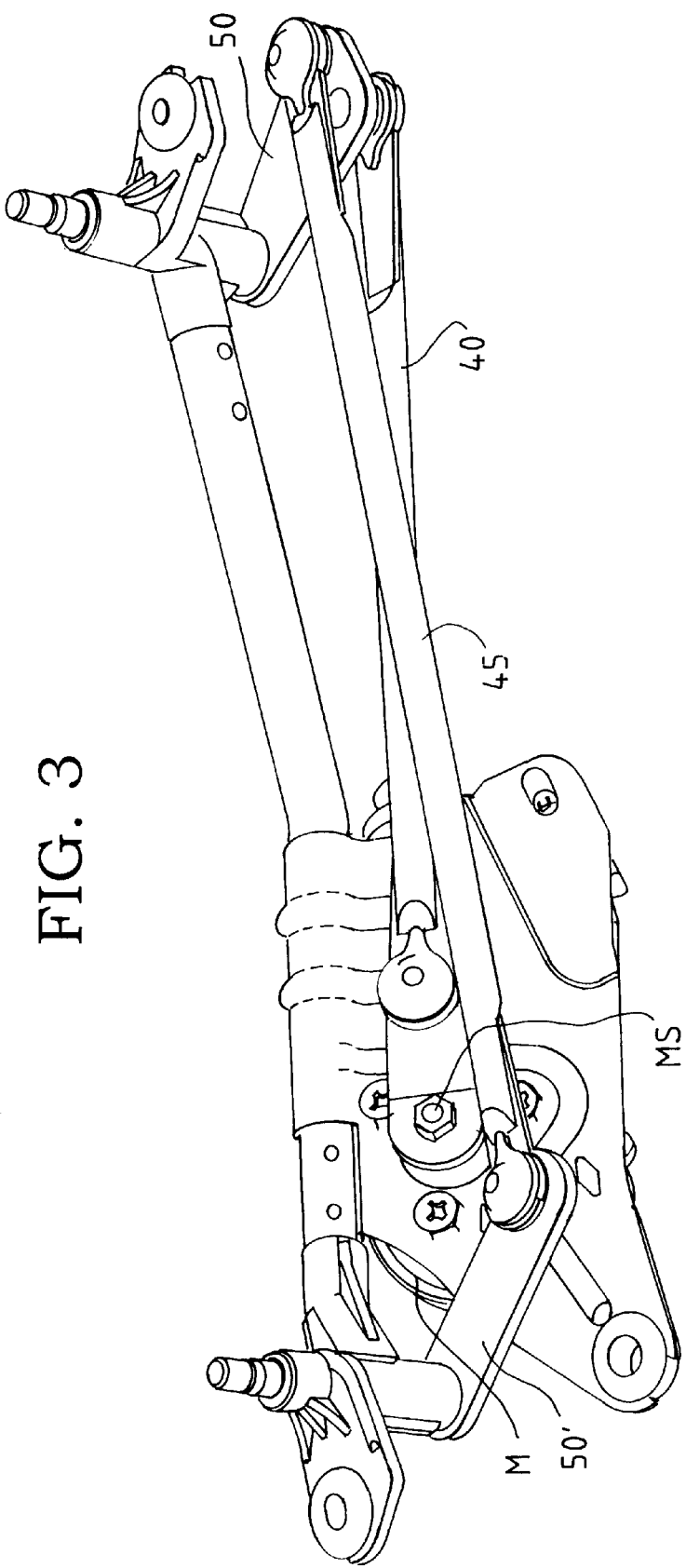
FIG. 3 is a perspective view of a wiper driving mechanism according to an embodiment of the present invention.
Figure 4:
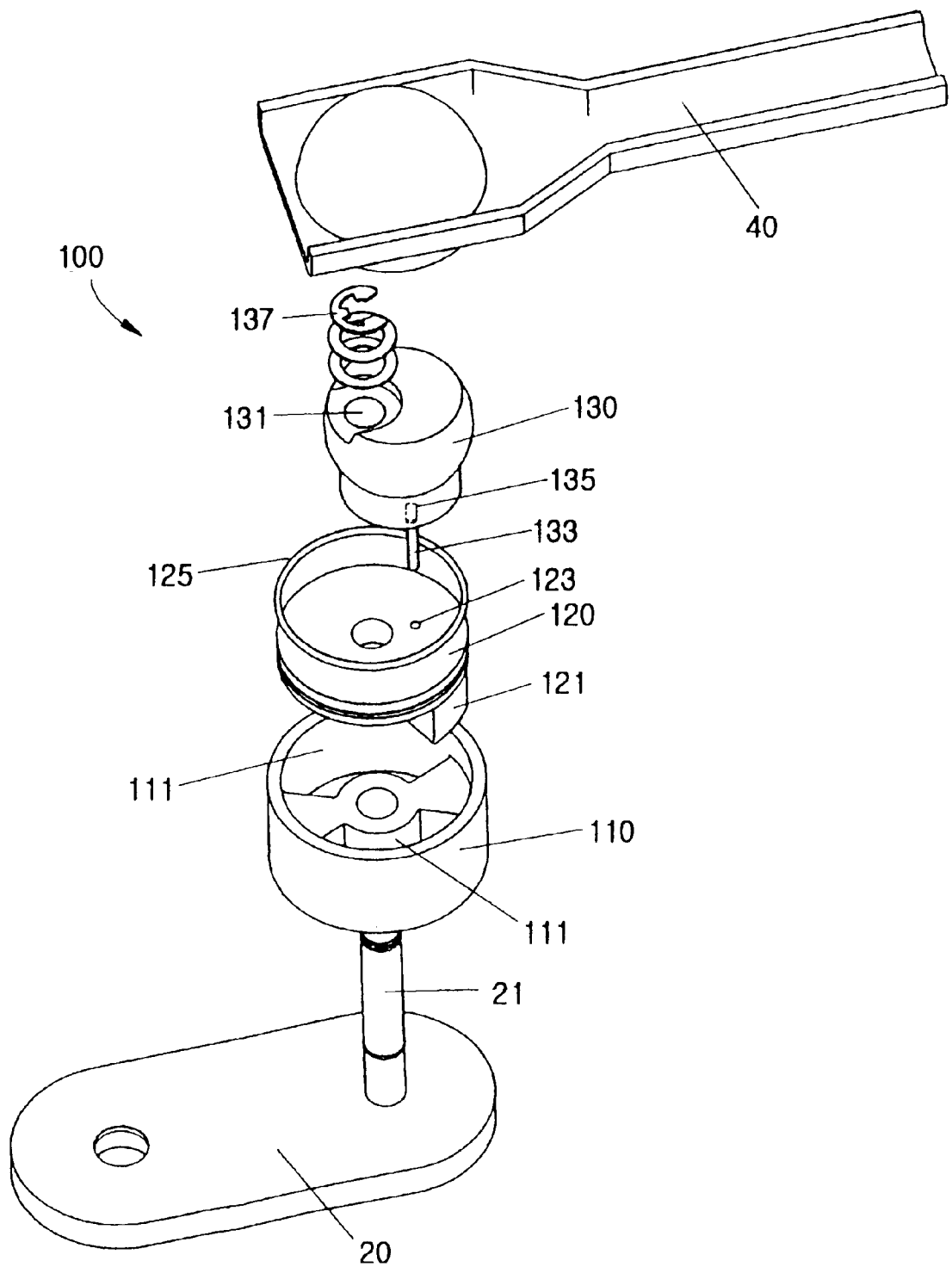
FIG. 4 is an exploded perspective view of a sequential wiper rotation type parking means according to the present invention.
Figure 5:
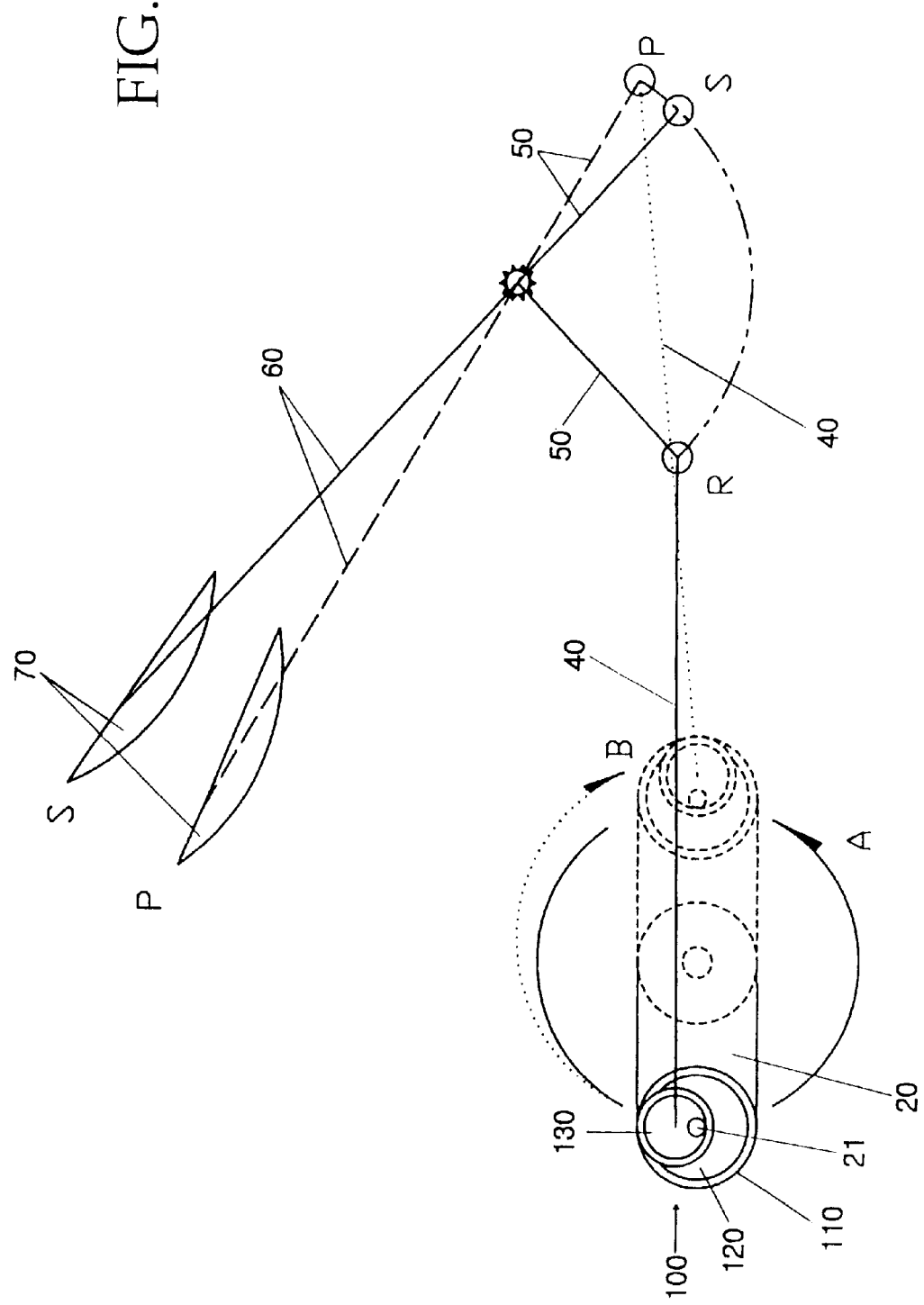
FIG. 5 is a view schematically illustrating a wiper driving mechanism according to the present invention.
Figure 6A:
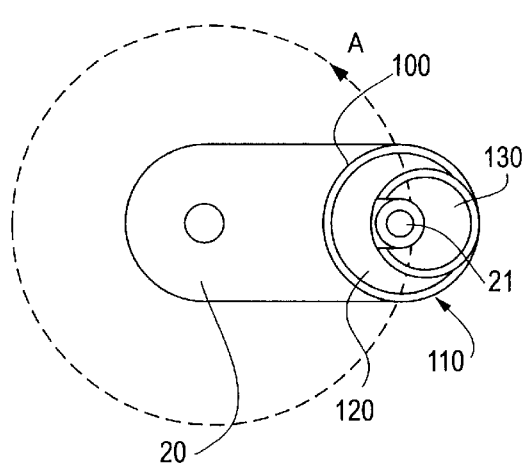
FIGS. 6A to 6E are views illustrating a normal operation state of a sequential wiper rotation type parking means according to the present invention during a forward rotation of the wiper.
Figure 6B:
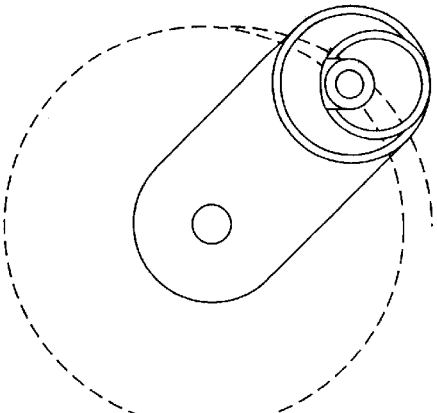
Figure 6C:
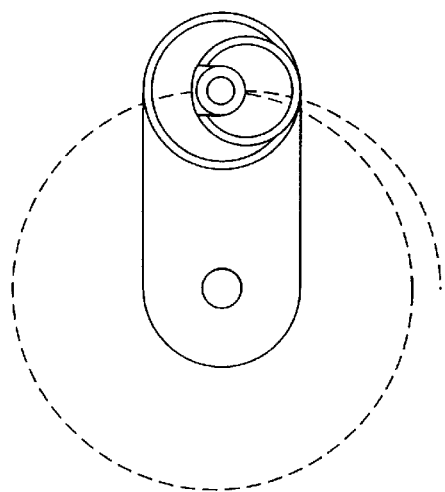
Figure 6D:
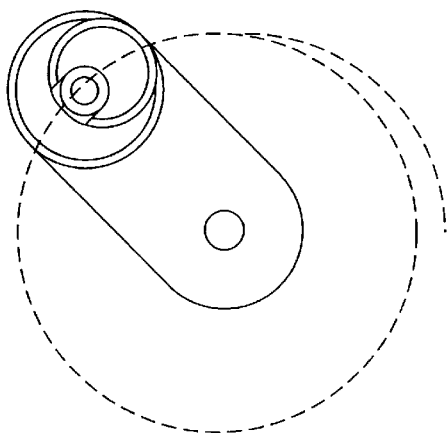
Figure 6E:
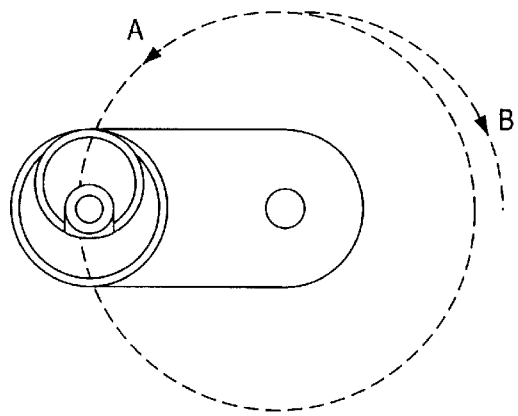

FIG. 3 is a perspective view of a wiper driving mechanism according to an embodiment of the present invention, FIG. 4 is an exploded perspective view of a sequential wiper rotation type parking means according to the present invention, and FIG. 5 is a view schematically illustrating a wiper driving mechanism according to the present invention. FIGS. 6A to 6E are views illustrating a normal operation state of a sequential wiper rotation type parking means according to the present invention during a forward rotation of the wiper, FIGS. 7A to 7E are views illustrating a parking operation state of a sequential wiper rotation type parking means according to the present invention during a reverse rotation of the wiper, and FIGS. 8A to 8C are views illustrating an operation state of the parking means at respective rotation angles which correspond to FIGS. 7A to 7C.

Referring to FIG. 3, a wiper driving mechanism 1 includes wiper blades 70 which receive a driving force from a driving lever 20 rotated by a rotating force of a wiper motor 1, and reciprocate between a start position (S) and a return position (R) so that the wiper blades wipe foreign substances such as moisture and dust scattered on a surface of a windshield glass.

The wiper driving mechanism 1 also includes a drive-force transfer arm 40 one end of which is hinge-connected to a free end of the driving lever 20 and the other end of which is hinge-connected to a driven lever 50 connected to one of the wiper blades 70, a connection arm 45 one end of which is hinge-connected to the driven lever 50 whose hinge connection point is apart for a predetermined distance from the hinge-connection point of the drive-force transfer arm 40 and the driven lever 50, and another driven arm 50', hinge-connected to the other end of the connection arm 45, for driving the other wiper blade 70 as it moves, being interlocked with the reciprocating movement of the connection arm 45.

Also, a hinge shaft 21 is projected from the free end of the driving lever 20 in a vertical direction.

A ball type pin 130 is fixed to one side of the driving lever 20, being eccentric for a predetermined distance with respect to the hinge shaft on the free end of the driving lever so that the ball type pin 130 moves downwardly and rotates in one direction as it traces a relatively small circular arc during a forward rotation of the driving lever (i.e., the rotating direction of an arrow 'A' in FIG. 5), while the ball type pin 130 moves upwardly and rotates in the other direction as it traces a relatively large circular arc during a reverse rotation of the driving lever (i.e., the rotating direction of an arrow 'B' in FIG. 5).

Also, a sequential wiper blade rotation type parking means 100 is fixed centering around the hinge shaft 21 on the free end of the driving lever 20 so that the ball type pin moves upwardly as it traces a curved line by applying a specified pressure to the ball type pin 130 during a rotation of the ball type pin 130.

Specifically, the sequential wiper blade rotation type parking means 100 is arranged between the ball type pin 130 and a side surface of the free end of the driving lever 20 so that the wiper blade 70 moves to a parking position (P) which is deeper than the start position (S) by rotating the driven levers 50 and 50' over the rotating angle according to the wiper operating mode as it eccentrically rotates with respect to the hinge shaft 21 of the free end of the driving lever 20.

The sequential wiper blade rotation type parking means 100 also includes a cylindrical body 110 one side of which is open, a plurality of compression spaces 111 symmetrically formed at predetermined angles based on a central point of the cylindrical body 110 and containing therein high-density fluid, and a rotating member 120 having a plurality of projections 121 received in the compression spaces 111, respectively, for providing a predetermined rotation-blocking force by compressing the high-density fluid as they rotate in contact with inner peripheries of the compression spaces centering around the hinge shaft of the driving lever 20 (i.e., the central point of the cylindrical body 110).

The ball type pin 130 has an eccentric hole 131, formed eccentrically from a central point of the ball type pin, for supporting the ball type pin to eccentrically rotate around the hinge shaft 21 of the driving lever 20, and an insertion hole 135, formed on a lower surface of the ball type pin 130, being apart for a predetermined distance from the eccentric hole 131, for receiving therein one end of a pin 133 the other end of which is inserted into a hole 123 formed on the rotating member 120 so that the ball type pin 130 is rotation-locked by the rotating member 120.

Also, an upper portion of the ball type pin 130 is supported by a snap ring 137 so that the ball type pin does not secede from the hinge shaft 21 of the driving lever 20. The rotating member 120 and the cylindrical body 110 are tightly sealed by a sealing member 125.

The operation of the wiper driving apparatus as constructed above according to the present invention will be explained in detail.

If power is supplied to the wiper motor M, the rotating shaft MS of the wiper motor M rotates forwardly (A), and this causes the driving lever 20 fixed in a body to the driving shaft to rotate in the direction indicated as the arrow 'A' in FIGS. 5, 6 and 7.

If the driving lever 20 rotates forwardly (A), the drive-force transfer arm 40 one end of which is hinge-connected to the free end of the driving lever 20 reciprocates and operates the driven lever 50, so that the wiper blade 70 reciprocates between the start position (S) and the return position (R) to wipe the windshield glass.

At this time, the ball type pin 130, since it is eccentric from the central position of the sequential wiper blade rotation type parking means so that it eccentrically rotates with respect to the hinge shaft of the driving lever, intermittently changes it position due to the inertial force of rotation of the wiper blade during the forward rotation (A), and thus the wiper blade tends to be overrun, deviating from its own return position. However, the displacement of the ball type pin 130 according to the inertial force of rotation of the wiper blade is accommodated to a predetermined extent by the sequential wiper blade rotation type parking means, and thus the overrun of the wiper blade is restricted.

Figure 7A:
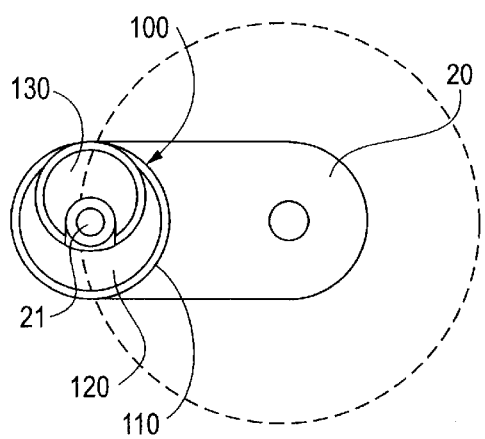
FIGS. 7A to 7E are views illustrating a parking operation state of a sequential wiper rotation type parking means according to the present invention during a reverse rotation of the wiper.
Figure 7B:
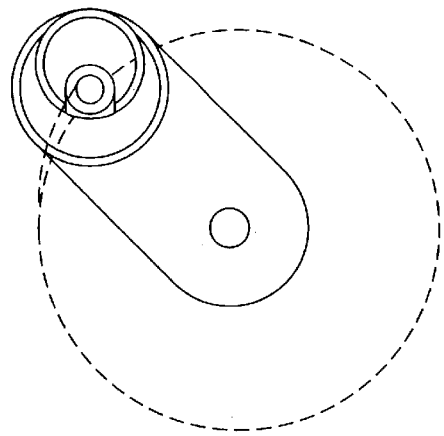
Figure 7C:
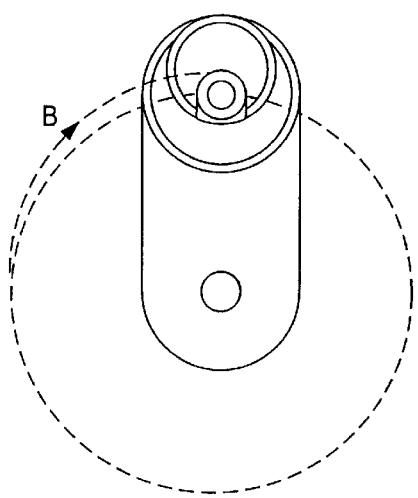
Figure 7D:
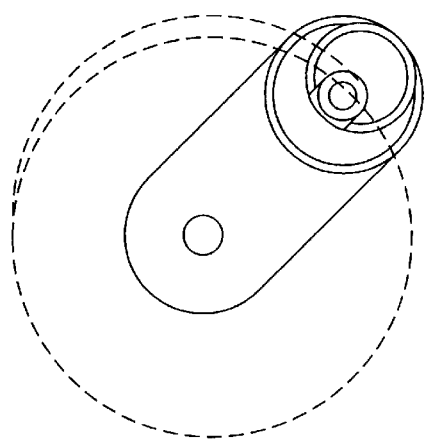
Figure 7E:
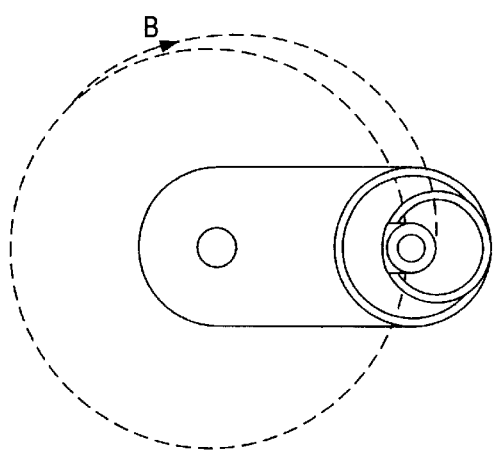
Figure 8A:
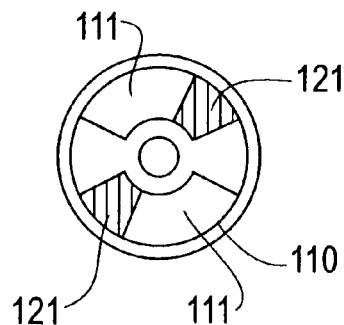
FIGS. 8A to 8C are views illustrating an operation state of the parking means at respective rotation angles which correspond to FIGS. 7A to 7C.
Figure 8B:
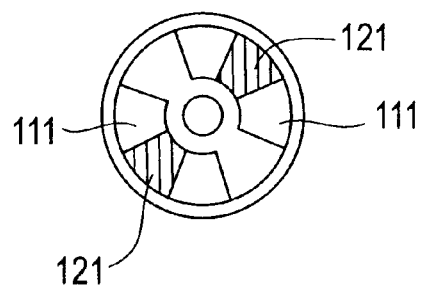
Figure 8C:
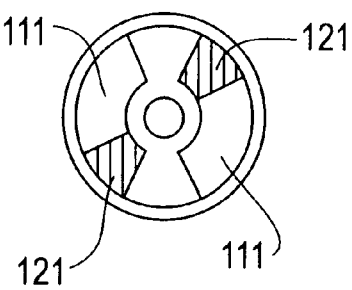

Meanwhile, as the sequential wiper blade rotation type parking means rotatably supported on the hinge shaft of the free end of the driving lever 20 operates, the ball type pin 130 rotates from the position of FIG. 7A to the position of FIG. 7C without the rapid rotation of the driving lever after the specified waiting time. Specifically, the projections 121 of the rotating member 120 produce the predetermined rotation-blocking force as they compress the high-density fluid, for instance, grease, contained in the compression spaces of the cylindrical body 110. Accordingly, the rotating member 120 rotates slowly before its rotating angle reaches 45° as shown in FIG. 7A, and then rotates over the rotating angle of 45° as shown in FIG. 7B so that the ball type pin 130 rotates slowly after it deviates from the influence of the inertial force of rotation, the frictional force of the wiper blade 70, and so on, resulting in that the wiper blade 70 can be parked at a normal speed.

In other words, the wiper can perform its own wiping function without temporarily stopping the rotation of the wiper blade. The ball type pin 130 rotates smoothly as it traces its maximum rotating radius and the central point of the ball type pin 130 goes away from the rotating shaft of the wiper motor M as it maintains a normal speed by restricting the rapid increase of its rotating radius occurring at the moment when it deviates from the influence of the inertial force of rotation of the wiper blade 70, i.e., at the reverse rotation state thereof by about 45° as shown in FIG. 7B, so that the wiper blades 70 can be sequentially parked without their temporary stop page.

Accordingly, when the wiper moves to the parking position (P), the overrun phenomenon of the wiper blade 70, which is the rapid rotation of the wiper blade 70 after the specified waiting time, occurring in the conventional apparatus using the folding type driving lever 20 and the sliding ball bearing 30*b*, can be prevented.

As described above, the wiper driving apparatus according to the present invention can perform its own wiping function without the overrun phenomenon during the forward rotation of the wiper blade, and prevent the temporary standstill phenomenon of the wiper blade by restraining the driving lever from rotating after the elapse of a specified time in which the driving lever stands still during the reverse rotation of the wiper blade, thereby improving the operational reliability of the apparatus.

While the present invention has been described and illustrated herein with reference to the preferred embodiment thereof, it will be understood by those skilled in the art that various changes in form and details may be made therein without departing from the spirit and scope of the invention.

What is claimed is:

1. A wiper driving apparatus for vehicles having wiper blades which receive a driving force from a driving lever rotated by a rotating force of a wiper motor, and reciprocate between a start position and a return position so that the wiper blades wipe foreign substances such as moisture and dust scattered on a surface of a windshield glass, the apparatus comprising:

a hinge shaft provided to be projected from the free end of the driving lever;

a ball type pin fixed to one side of the driving lever, being eccentric for a predetermined distance with respect to the hinge shaft on the free end of the driving lever so that the ball type pin moves downwardly and rotates in one direction as it traces a relatively small circular arc during a forward rotation of the driving lever while the ball type pin moves upwardly and rotates in the other direction as it traces a relatively large circular arc during a reverse rotation of the driving lever; and a sequential wiper blade rotation type parking means fixed centering around the hinge shaft on the free end of the driving lever so that the ball type pin moves upwardly as it traces a curved line by applying a specified pressure to the ball type pin during a rotation of the ball type pin.

2. The wiper driving apparatus as claimed in claim 1, wherein the sequential wiper blade rotation type parking means comprises:

a cylindrical body one side of which is open;

a plurality of compression spaces symmetrically formed at predetermined angles based on a central point of the cylindrical body and containing therein high-density fluid; and a rotating member having a plurality of projections received in the compression spaces, respectively, for providing a predetermined rotation-blocking force by compressing the high-density fluid as they rotate in contact with inner peripheries of the compression spaces centering around the hinge shaft of the driving lever.

3. The wiper driving apparatus as claimed in claim 2, wherein the ball type pin comprises:

an eccentric hole, formed eccentrically from a central point of the ball type pin, for supporting the ball type pin to eccentrically rotate around the hinge shaft of the driving lever; and an insertion hole, formed on the lower surface of the ball type pin, being apart for a predetermined distance from the eccentric hole, for receiving therein one end of a pin the other end of which is inserted into a hole formed on the rotating member so that the ball type pin is rotation-locked by the rotating member.

* * * * *